United States Patent
Iler

[15] 3,668,088
[45] June 6, 1972

[54] METHOD OF PRODUCING COLLOIDAL SILICA BY ELECTRODIALYSIS OF A SILICATE

[72] Inventor: Ralph K. Iler, Wilmington, Del.

[73] Assignee: E. I. du Pont de Nemours and Company, Wilmington, Del.

[22] Filed: Dec. 2, 1969

[21] Appl. No.: 881,371

[52] U.S. Cl. ........................................................204/101
[51] Int. Cl. ...........................................................B01k 1/00
[58] Field of Search ..........................204/101, 180 P; 23/144

[56] References Cited

UNITED STATES PATENTS 2,244,325  6/1941  Bird ......................................23/144 X
2,577,485  12/1951  Rule ......................................252/313

Primary Examiner—Winston A. Douglas
Assistant Examiner—H. A. Feeley
Attorney—Don M. Kerr

[57] ABSTRACT

Silica sol is made by electrodialysis of a solelectrolyte containing an aqueous silica sol, aqueous sodium or potassium silicate, and a supplementary electrolyte such as sodium or potassium carbonate or sulfate. Temperature is maintained at 50° to 100° C. A source of non-siliceous anion is added as needed to maintain normality of the supplementary electrolyte between 0.01 and 0.15, and silicate is added as necessary to maintain pH between 8.0 and 9.5. After the electrodialysis, most of the sodium ions and the anions of the supplementary electrolyte are removed by treatment with ion exchange resins, then the sol is concentrated to 30 or 40 percent silica.

4 Claims, 1 Drawing Figure

PATENTED JUN 6 1972
3,668,088
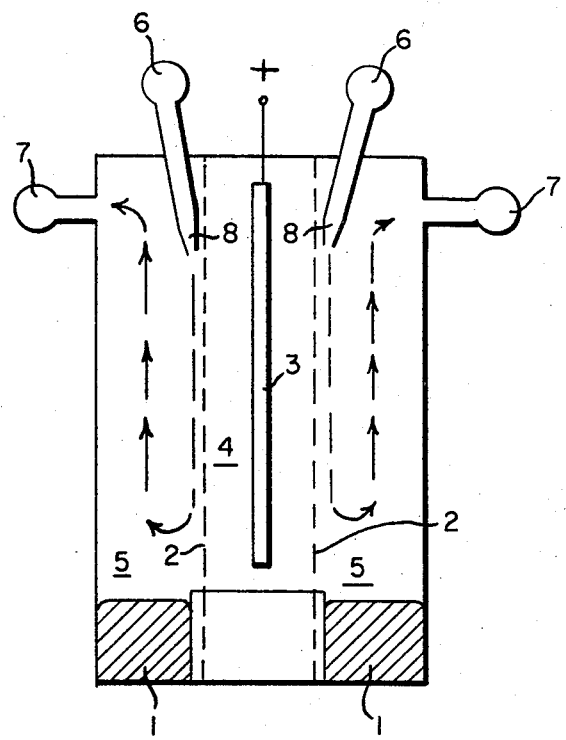
INVENTOR
RALPH K. ILER
BY
ATTORNEY

METHOD OF PRODUCING COLLOIDAL SILICA BY ELECTRODIALYSIS OF A SILICATE

BACKGROUND OF THE INVENTION

Silica sols are made commercially by starting with very small silica particles or nuclei in dilute aqueous dispersion, adding sodium silicate solution, and removing sodium ions with an ion exchange resin. Silicic acid liberated from the sodium silicate is deposited upon the silica particles already present, increasing the silica concentration and particle size.

The prior art reveals that there have been some attempts to make sols by removing the sodium ions from sodium silicate by electrolysis or electrodialysis, but in no case has it been possible to produce colloidal silica of such a particle size and sufficiently free from aggregation that a stable concentrated sol can be prepared. In most instances, the product sols of the prior art either gel or precipitate silica within the electrolysis equipment. For example, as described by Vail, "Soluble Silicates," Vol. I, page 96 - "Treadwell and Wieland prepared pure silica sols by electrolysis of sodium silicate solution between a rotating platinum anode and a flowing mercury cathode from which the sodium produced by the electrolysis was continuously removed (Helv. Chim. Acta, 13, 842 (1930); Trans. Faraday Soc., 31, 297 (1953); Helv. Chim. Acta, 16, 54 (1933)). In this instance the deposition of silica at the anode was minimized by rotating the anode to avoid deposition of solids." However, only relatively dilute sols were prepared, and there was no control of the size of the colloidal particles so that a uniform concentrated product, useful in the arts, could not be manufactured.

In accordance with U.S. Pat. No. 1,132,394 of March 16, 1915, B. Schwerin used and electrically charged membrane that excluded anions, but was permeable to cations, to permit the removal of sodium ions from the silicate solution but not the silica. The process was impractical because to produce the final product, a voltage of 60 or 70 volts had to be applied and the power required per unit of silica was excessive. Only very dilute solutions were produced and there was no control of the particle size of the silica to produce a usefully concentrated, uniform and stable product.

U.S. Pat. No. 1,562,940 to Collins, Nov. 24, 1925, recognized the problem of depositing silica on the anode while using mercury as the cathode and attempted to solve the problem by rotating the anode at high speed. The inventor did not attempt to control the particle size of the silica produced, and the composition of the solution was not regulated to produce a uniform product. The process was carried out at relatively low temperature under conditions where, as is now known, only extremely small particles of colloidal silica are obtained which cannot be concentrated without gelling.

In German Pat. No. 482,177 to Praetorius and Wolf, March 19, 1925, the need for a membrane or diaphragm between the silica-containing solution being electrodialyzed and the anodes was recognized, and a diaphragm was employed so that a 3 percent solution of silicic acid was made. However, the suggested diaphragm materials were permeable both to silicate ions and to the acid that is formed around the anode, so that control of the purity and particle size of the silica sol was impossible.

In French Pat. No. 968,361, Apr. 19, 1950, published Nov. 24, 1950, a pure colloidal silica was prepared using a mercury cathode and removing sodium from sodium silicate to produce a sol at pH 7, which was unstable. Under these conditions, operating at low temperature, in accordance with the teachings of the patent, only very small colloidal silica particles could be produced, and essentially all of the stabilizing sodium ions were removed at pH 7, so that only a very dilute, unstable sol was obtained. Furthermore, in the attempt to remove all of the sodium ions, the resistance of the sol was greatly increased and higher voltage was employed so that relatively large amounts of power were required per unit of colloidal silica obtained.

SUMMARY OF THE INVENTION

My invention is an improved electrodialysis process for making silica sol. In the electrodialysis process a sol-electrolyte containing an aqueous silica sol and an aqueous sodium silicate solution is electrolyzed while separated from an acid anolyte by a cation-permeable, anion-impermeable membrane. In this process hydrogen ions from the anolyte are drawn through the membrane into the sol-electrolyte and sodium ions are removed to the cathode. The silica from the sodium silicate deposits on the silica particles present in the sol-electrolyte.

I have discovered that improvements in the process and in the resulting product are obtained by: (a) maintaining the temperature of the sol-electrolyte between 50° and 100° C.; (b) maintaining in the sol-electrolyte a supplementary electrolyte in the form of a sodium salt of a non-siliceous anion at a concentration between 0.01 and 0.15 normal; and (c) adding aqueous sodium silicate to the sol-electrolyte as needed to maintain the pH of the sol-electrolyte between 8.0 and 9.5.

Temperature between 50° and 100° C. and pH above 8 are conditions required to permit growth of the silica particles by accretion of silica from sodium silicate to a size sufficiently large that the sol can subsequently be concentrated to a stable colloidal solution with a high silica content, such as 40 percent by weight. At lower temperature and pH, only extremely small particles of colloidal silica are obtained, and the sols can therefore not be concentrated without gelling.

The purpose of the supplementary electrolyte is to lower the electrical resistance of the sol-electrolyte by providing anions other than silicate and hydroxyl ions to carry the current toward the anode. In the absence of supplementary electrolyte, the current is carried by hydroxyl ions and silicate ions which are present only at very low concentrations in the pH range 8 to 9.5. Furthermore, when the current is carried by silicate ions, these ions migrate toward the anode and deposit silica upon the membrane, thus further increasing the resistance and eventually terminating the process. There is an upper limit to the amount of supplementary electrolyte that can be present. If more than about 0.15 normal sodium salt such as sodium sulfate is present, the colloidal silica particles in the mixture tend to aggregate, even at the preferred pH of 9.

Even in the presence of supplementary electrolyte, silica still migrates toward the anode if the pH of the sol-electrolyte is appreciably higher than about 9.5, but little migration occurs when the pH is maintained between 8 and 9.5, such in this pH range the concentration of silicate ions in solution is very low relative to the non-siliceous anion.

In this summary and the description to follow use of sodium silicate and other sodium salts is described, but it will be understood that potassium salts can be used instead.

THE DRAWING

The drawing is a diagrammatic representation of an electrodialysis cell suitable for carrying out the improved process of this invention. Two mercury cathodes 1 are used with one platinum anode 3. Perpendicular cation-permeable, anion-impermeable membranes 2 separate anolyte chamber 4 from sol-electrolyte chambers 5. Headers 6 and 7 are provided for circulation of sol-electrolyte through chamber 5.

DETAILED DESCRIPTION

One starting material for this process is an aqueous silica sol with very small particles (nuclei) of colloidal silica, less than 10 millimicrons, and usually less than 5 millimicrons, in particle diameter. The nuclei may be made within the electrodialysis apparatus by removing sodium from a dilute solution of sodium silicate, or in separate equipment by mixing sulfuric acid into a dilute solution of sodium silicate with good agitation until the pH is reduced to about 9. In the latter case the reaction of the sulfuric acid with the sodium silicate provides the supplementary electrolyte, sodium sulfate, in solution; in the former, a source on non-siliceous anion, e.g. carbon dioxide or sulfuric acid, can be added to the solution of sodium silicate before removal of sodium ions is begun.

The sodium silicate used to produce the starting sol and for subsequent additions is conveniently a solution of water glass containing 3.75 parts of $SiO_2$ per part of $Na_2O$. The aqueous solution of colloidal silica, sodium silicate and supplementary electrolyte is referred to herein as the sol-electrolyte.

Referring to the drawing, sol-electrolyte is formed or placed in the chambers 5 and circulated through the sol-electrolyte system. The sol-electrolyte is injected through orifices 8, under pressure from the inlet headers 6, creating jets and turbulence as indicated by the arrows. The sol-electrolyte must be agitated strongly near the surfaces of the membranes 2 in order to dislodge gas bubbles and prevent deposition of silica. Sol-electrolyte leaves the cell through outlets to collector header 7, to be recycled through a pump and a heat exchanger (not shown) to inlet header 6. The heat exchanger maintains the sol-electrolyte temperature at 50° to 100° C.

When an adequate amount of silica nuclei are present in the hot sol-electrolyte, sodium silicate solution is added through 8 at a rate such that the rate of introduction of sodium ion equals the rate of removal by electrodialysis. Thus, by suitable control of concentration and temperature, all of the silica in the added silicate is deposited upon the nuclei, which are thus grown to larger size. Generally speaking, if the colloidal silica in the electrolyte has a specific surface area greater than 100 square meters per gram then, for every part by weight of silica in the sol-electrolyte, as much as another part by weight of silica can be added as sodium silicate in a period of an hour, without forming new nuclei, at 80° to 100° C. At the same time, the silica concentration in the system increases if the concentration of silica in the added sodium silicate solution exceeds the concentration of silica in the circulating sol-electrolyte.

The improved electrodialysis process of this invention produces silica sols containing supplementary electrolyte and containing 5 to about 35 percent by weight of $SiO_2$ in the particle size range of 6 to 50 millimicrons diameter, the larger particles being capable of production at the higher concentrations. The supplementary electrolyte can be removed and the sols can be concentrated to 20 to 40 percent by weight of silica (depending upon particle size), stabilized with suitable amounts of alkali.

The fact that the sols can be concentrated to 20 or 40 percent to provide stable concentrated sols is an important feature of this invention, and the maintenance of a temperature in the range 50 to 100° C. is important in achieving this feature. For the production of silica colloids that can be economically transported and used in many applications, a silica concentration greater than about 10 percent, and preferably greater than 20 percent is necessary. Silica sols must consist of particles larger than about 5 millimicrons in size in order to be concentrated to more than 20 percent silica as a stable commodity. Preferably, the particles are at least 8 millimicrons in diameter so as to produce a stable sol containing 30 per cent by weight of silica. I have found that if the electrodialysis process is carried out at ordinary temperature, the particles of the colloidal silica in the system remain very small, generally less than 5 millimicrons in diameter, while if the process is carried out at 80° C., for example, a sol containing particles larger than 8 millimicrons is obtained.

The importance of maintaining pH between 8 and 9.5 and maintaining the normality of supplementary electrolyte between about 0.01 and 0.15 has been explained above. It should be observed that these factors become more important as the concentration of colloidal silica in the sol-electrolyte increases from about 5 percent to 10 or 20 percent, and also with smaller particle sizes of colloidal silica.

The cation-permeable, anion-impermeable membranes 2 used in this invention are known materials. The membrane may be either a polymer containing copolymerized sulfonated styrene or a polymer containing copolymerized unsaturated carboxylic acids. The former are known as "sulfonic acid type membranes" and the latter are known as "carboxylic acid type membranes."

An aqueous solution of sulfuric acid or other acid stable to continued hydrolysis is used as anolyte in the anolyte compartment 4. The anode 3 used will depend upon the anolyte used. With sulfuric acid, a lead anode is used. With hydrochloric acid, a graphite or dense carbon anode is used. With these or other acids, a platinum anode or metal anode covered with a very thin film of platinum may be employed.

The supplementary electrolyte may be added in the form of the sodium salt, or a source of non-siliceous anion may be added which will form the supplementary electrolyte in situ. For example, sodium carbonate and/or bicarbonate may be provided in the catholyte by adding carbon dioxide. Carbonate (or bicarbonate) is the preferred non-siliceous anion because of the cheapness of carbon dioxide and the ease of handling it. Sulfates, chlorides, phosphates, borates, nitrates, acetates, and the like, can also be used as supplementary electrolyte.

If carbonate is used as supplementary electrolyte, it is found that most of the carbonate is retained within the catholyte, since the hydrogen ions coming through the membrane from the anode react with the carbonate ion and generate carbon dioxide which immediately redissolves in the alkaline sol. However, some carbon dioxide, bearing no charge, travels through the membrane and into the anode compartment where it is liberated along with the oxygen. This carbon dioxide can be recovered by scrubbing the gas with the catholyte.

In a preferred aspect of the process of this invention, the supplementary electrolyte of sodium sulfate is employed at a concentration of from about 0.03 to 0.08 normal. Within this concentration range, the sol electrolyte has a sufficiently low electrical resistivity to permit the use of a practically low voltage on the cell, while at the same time the colloidal silica concentration can be greatly increased in the course of the process by the continued addition of concentrated sodium silicate solution, so that a silica sol containing as much as 35 grams of $SiO_2$ per 100 mls. or more, can be obtained without appreciable deposition of silica on the ion exchange membranes or formation of silica aggregates or gel.

Such sols containing from 30 to 40 grams of $SiO_2$ per 100 mls. may be deionized by passing through a mixed bed of anion and cation exchange resins, and are thereafter very stable under ordinary storage conditions.

Deionization is preferably accomplished by passing the sol through a bed of mixed anion and cation exchange resins, as will be apparent to those skilled in the art. Sulfate can be removed by precipitating it from the sol as strontium or barium sulfate. Carbonate can be precipitated and removed as calcium carbonate.

Instead of the platinum anode shown in FIG. I, which can be used with supplementary electrolytes of sodium or potassium carbonate and sodium or potassium sulfate, a graphite electrode is used when the supplementary electrolyte is sodium chloride and the anolyte is a solution of hydrochloric acid. When sodium sulfate is used as the supplementary electrolyte, the anolyte will be an aqueous solution of sulfuric acid and, in this case, the anode is a lead alloy containing about 7 percent of antimony, or a lead alloy containing from 2 to 30 percent silver.

When a mercury cathode is used, the silica sol is in direct contact with the mercury. The sodium ions are converted to metallic sodium which forms an analgam in the mercury as in the conventional alkali-producing mercury cells, and the mercury is circulated through a separate compartment, where sodium hydroxide is recovered by reaction with water, and hydrogen is evolved.

Instead of a mercury cathode, a porous diaphragm that permits the passage of ions but not of colloidal particles may be placed between the sol-electrolyte and a cathode compartment containing a steel cathode surrounded by a catholyte of dilute alkali. Current efficiency is lower than with a mercury cathode but is improved by maintaining a pressure of sol-electrolyte to maintain slow flow of water through the diaphragm towards the cathode.

As an alternative to the mercury cathode or to a porous diaphragm separating the sol from the cathode, a pair of cation-permeable, anion-impermeable membranes may be employed as described in copending application of Ralph K. Iler and W. John Sloan, filed simultaneously herewith Ser. No. 881,372 now abandoned, and as illustrated in Examples IV–VI below.

EXAMPLE I

This is an example of the preparation of a silica sol using an apparatus of the type depicted in the drawing. An anolyte of 10 percent by weight sulfuric acid is placed in chamber 4. To obtain greatest use of the platinum anode 3, the anolyte is enclosed on two sides by two cation-permeable membranes 2; on the other side of each membrane is a chamber 5 containing sol-electrolyte and a mercury cathode 1. The cell in length is 22 inches and the width of each mercury cathode surface is half an inch, while the height of the membranes is 2 inches. The catholyte is injected through jets or orifices 8 in a direction downward parallel to the membranes 2 through tubes with inside diameter of one-eighth inch flattened to form a constriction so as to create a jet, located every inch along the length of the cell, under a pressure of 20 pounds per square inch with such force as to create turbulence and dislodge gas bubbles as they may be formed on the vertical surface of the cation-permeable membrane 2. The sol-electrolyte is circulated at a rate of about 5 gallons per minute from the cell to a receiver tank where it is permitted to evolve any foam and is screened through a metal screen to remove particles that might plug the jets, and into a storage tank from which it is fed to the circulating pump. Then after leaving the pump it passes through a steam-jacketed heat exchanger where it is further heated to maintain the desired temperature and returned to the inlet header 6 of the sol-electrolyte compartment.

A side stream of sol-electrolyte is cooled and circulated through a cooler to a cell containing electrodes for measuring pH. The electrodes constantly exposed to this flowing stream are slowly deteriorated and are regularly replaced when the pH does not agree with that of samples taken at the same time, cooled, and measured at room temperature on separate electrodes that have been separately standardized. All pH measurements are expressed as measured at 25° C., on samples taken and cooled within 5 minutes.

The total alkalinity of the sol-electrolyte is determined by titrating samples with standard acid down to pH 3.5 and expressed as normality of base.

Carbon dioxide gas is added as necessary to form a supplementary sodium carbonate electrolyte, the gas being added to the intake of the circulating pump to ensure rapid dispersion and dissolution. The lower portions of the sol-electrolyte compartments are in the form of troughs through which mercury is circulated to a depth of about 0.25 inches and then circulated to a separate denuder tank in which the mercury flows under water in a trough containing stainless steel screen to catalyze decomposition of the sodium amalgam to form a solution of sodium hydroxide in the water and liberate gaseous hydrogen. The mercury is recirculated to the sol-electrolyte compartment of the electrolysis cell.

The platinum anode and mercury cathode are connected to a source of direct current of which the applied voltage may range from five to 15 or 20 volts and the power source capable of supplying a total of up to 20 amperes to the cell. The current is adjustable by varying the voltage of the power supply.

As a starting solution, 300 milliliters of diluted "F" Grade (Du Pont) solution of sodium silicate containing 200 grams of $SiO_2$ per liter and 3.25 parts of silica per part of $Na_2O$, is diluted with 3 liters of distilled water and placed in the sol-electrolyte system. About 700 milliliters of 1.5 normal sulfuric acid is placed in the anode compartment. Water is placed over the mercury in the denuder.

The sol-electrolyte is circulated and heated to 80° C., which also heats the cell to this temperature. The sol-electrolyte initially has a pH of about 11 and is carbonated to reduce the pH to 9. The concentration of sodium ion by titration is 0.18 normal. Power is applied and a solution of sodium silicate containing 200 grams per liter of silica and 62 grams per liter of $Na_2O$ is fed in at a rate of 495 mls. in 135 minutes, during which time an average current of 12 amperes is passed through the cell with the application of 13 volts. The pH remains constant. Seven hundred milliliters of sol product are removed from the system, containing 3.1 per cent colloidal silica with a specific surface area of 275 square meters per gram. The operation is continued for 2½ hours and 800 mls. of sol are removed, containing 5.0 per cent colloidal silica, with a specific surface area of 234 $m^2/g$. The total concentration of sodium ion is titrated and found to be 0.10 normal. During the next 9 hours of operation a total of 3,000 mls. of sodium silicate solution containing 20 percent $SiO_2$ and 2.0 normal in NaOH is added continuously and power applied with varying voltage to maintain a current of 12 to 15 amperes, depending on the pH of the sol-electrolyte and the sodium ion concentration. When the latter concentration falls below 0.10 normal, the current is reduced and carbon dioxide admitted to maintain pH 9.0, and when it exceeds 0.12, current is increased and the rate of adding silicate solution is reduced and the flow of carbon dioxide is stopped. During the nine hours operation, 500 mls. of sol are removed after the first hours, containing 7 percent silica, and 1,000 mls. removed later containing 7.7 percent silica, while at the end, 3,400 mls of sol containing 8.0 percent silica are obtained.

During this time, for a period of 30 minutes the sodium ion concentration reaches 0.15 normal, and silica is deposited on the membrane; this is removed and the operation resumed, the period of shutdown not being counted as operating time.

Out of a total of 760 grams of silica introduced as sodium silicate, 445 grams is recovered as silica sol, the rest being lost during cleanout and as silica gel when the operation is not within the preferred limits of operating conditions.

The specific surface area of the silica in the final 3,400 mls. of colloidal silica is 150 square meters per gram.

The latter sol is ion exchanged with a cation exchange resin in ammonium form to replace sodium with ammonia and with a weak-base type of anion exchange resin in carbonate form to exchange traces of sulfate and chloride for carbonate ions, then concentrated by boiling down at 100° C., keeping the heating surfaces submerged, whereby ammonia and carbon dioxide are evolved and a sol containing 30 percent by weight of silica and having a pH of 7.8 is obtained.

The sol is a whitish but translucent fluid, appearing orange in transmitted light, and is indefinitely stable in a closed container at ordinary temperature. It consists essentially of silica and water, with less than 1 percent of ammonia and bicarbonate ions.

EXAMPLE II

Using an apparatus as in Example I, a silica sol of 10 millimicrons in particle size is increased in particle size and overall concentration of silica by adding sodium silicate, adding a supplementary electrolyte of carbonate ions and removing sodium ions by electrolysis into a mercury cathode while maintaining a pH of 8.5, a sodium ion concentration of 0.1 normal, a temperature of 80° C. and intense agitation of the sol-electrolyte at the surface of the ion exchange membrane.

The sol-electrolyte system is filled with 685 mls. of a silica sol containing 30 percent by weight of 10 millimicron silica particles stabilized with 0.6 percent by weight of alkali as $Na_2O$, 160 mls. of 1.0 molar solution of sodium bicarbonate as supporting electrolyte, and water to make up a total volume of 3,150 mls. The pH is 9.2 and is reduced to 8.5 by adding carbon dioxide.

As the sol-electrolyte is circulated, a solution of sodium silicate containing 200 grams per liter of $SiO_2$ and alkali equivalent to 2.0 normality, is added at a rate of about 270 mls. per hour and a current of 13 amperes is maintained over a 4 hour period while carbon dioxide is added to maintain the pH below 8.6, but not below 8.2. During the first 4 hours the silica concentration arises from 8 percent to 9.75 percent with no visible deposition of silica.

Some carbon dioxide is evolved through the membrane into the anode compartment; this is recovered by absorbing the gas from the anode chamber in the recirculating alkaline sol-electrolyte liquor.

The initial colloidal silica, 247 grams of $SiO_2$ of specific surface area of 300 m²/g. (about 10 millimicrons size) is thus converted to a sol of larger particle size as the electrolysis progresses. A sample of 50 mls. is taken every 30 minutes during the experiment and it is found that the specific surface area of the silica decreases regularly from 300 to 236 square meters per gram corresponding to a growth of particles from an average of about 10 to about 12 millimicrons in diameter.

In a 5th hour of operation an attempt is made to reduce the sodium carbonate content of the sol by further electrolysis without further addition of carbon dioxide and by adding sodium silicate solution only enough to maintain the pH above 8.2. As carbon dioxide is lost from the system, the sodium ion concentration at pH 8.5 also decreases; however, as it drops below 0.05 normality, silica gel is deposited on the cation-permeable membrane. Also it is observed that the potential required to maintain a current of 13 amperes increases from 13 to 20 volts as the sodium ion normality decreases from 0.10 to 0.045. As the concentration of supplementary sodium carbonate or bicarbonate electrolyte decreases, this considerably increases the power input necessary to remove a given amount of sodium ion from the electrolyte.

The sol produced from the electrolysis is purified and concentrated as in Example I.

EXAMPLE III

The apparatus of Example I is modified by replacing the platinum anode with one of a lead alloy containing 7 percent antimony, and a sol-electrolyte is electrodialyzed, using sodium sulfate as the supplementary electrolyte.

The anolyte is a 20 percent aqueous solution of sulfuric acid. The sol-electrolyte system is charged with 1,500 mls. of a solution of sodium silicate containing 3.0 percent silica and alkali equivalent to 0.92 percent sodium oxide. This solution is circulated through the apparatus and heated to 80° C. with no current passing, and over a period of 15 minutes 1,500 mls. of 0.2 normal sulfuric acid is added just ahead of the circulating pump to the silicate solution which is being circulated at a rate of 10 liters per minute. This reduces the pH below 10 and produces a dilute silica sol of particles less than 8 millimicrons in diameter and containing 0.10 normal sodium sulfate. Current is turned on and a feed solution of sodium silicate is added continuously to the circulating sol electrolyte at a rate such as to maintain a constant pH of 9.0. The feed solution contains 10 grams of $SiO_2$ per 100 mls. and alkali equivalent to 1.0 normality. For 500 mls. of this solution added per hour, a current of about 13 amperes is required to maintain the pH between 8.5 and 9.3.

The sol electrolyte is accumulated in the circulating system while 6,000 mls. of feed solution are added over a period of 12 hours. The sol electrolyte then contains 640 grams of silica in 9 liters of solution, or about 7 percent silica, of which the particle size is mostly between 15 and 25 millimicrons.

This sol is then deionized by passing it through a bed of mixed cation exchange resin in hydrogen form and anion exchange resin in free base form, then alkali equivalent to 0.05 percent $Na_2O$ in the solution is added to give an $SiO_2:Na_2$ ratio of about 140:1 and the sol is concentrated to 40 percent by weight of $SiO_2$ by the evaporation of water. The fluid sol is translucent and stable. Over 90 percent of the alkali of the sodium silicate is recovered as a 50 percent solution of sodium hydroxide in the denuder.

EXAMPLE IV

This example of the invention shows that by using a low concentration of supplementary electrolyte with the expenditure of a correspondingly greater amount of power to produce a given amount of colloidal silica, it is possible to produce silica sols of high concentration.

A cell is employed containing two cation-permeable, anion-impermeable membranes between which the sol electrolyte is circulated; on the other side of one membrane is a solution of sulfuric acid containing a lead alloy anode and on the other side of the second membrane is a solution of sodium hydroxide containing a stainless steel cathode. Both membranes are of the "strong acid" type and contain an organic polymer containing sulfonic acid groups such as a sulfonated polystyrene. These two membranes are parallel and spaced about one-fourth inch apart and the sol electrolyte is circulated between the two membranes at a rate of 5 gallons per minute per square inch of cross-section of area between the membranes, the cross-section of area being measured in the plane perpendicular to the direction of flow. The two parallel membranes are held in the cells so that the exposed area of each membrane is 2 inches high and 22 inches long. The sol electrolyte is injected into one end of the 22 inches long space between the two membranes and removed from the other end and recirculated. The circulating sol electrolyte is stored in an insulated tank from which a pump circulates the sol through a heat exchanger to the electrodialysis cell and back to the tank.

The anode is in an anolyte compartment filled with a 20 percent by weight aqueous sulfuric acid solution and the cathode is in a catholyte compartment filled with 12 percent sodium hydroxide solution. The acid solution is recirculated through the anolyte compartment and the alkali through the catholyte compartment by separate pumps from storage tanks which are vented to permit the escape of oxygen and hydrogen gases in the returning anolyte and catholyte, respectively.

The sol electrolyte is heated to a temperature of about 80° C. for operation of this process.

The sol electrolyte system is loaded with 1,875 mls. of a dilute solution of sodium silicate containing 1.0 percent by weight of $SiO_2$ and alkali equivalent to 0.31 percent of sodium oxide. This solution is heated to a temperature of 80° C. and circulated through the sol electrolyte system while 625 mls. of a dilute sulfuric acid solution having a normality of 0.225 is added uniformly over a period of 83 minutes; this amount of acid neutralizes about 75 percent of the alkali and the silicate solution and gives a dilute silica sol, having a pH of about 10. The normality of the sulfate ion is 0.056.

This mixture is then circulated at a temperature of 80° C. through the center compartment of the electrodialysis cell and simultaneously, while direct current is passed through the cell, a concentrated solution of sodium silicate is added to the intake of the circulating pump at such a rate that the pH of the circulating sol remains constant at about 9.3.

The concentrated sodium silicate is a commercial solution of waterglass containing 28.4 percent $SiO_2$ and 8.7 percent by weight of sodium oxide, which corresponds to 400 grams of $SiO_2$ per liter and an alkali concentration of 4.0 normality.

The concentration of the sodium hydroxide in the catholyte is held at 3.0 normality by the addition of water to maintain this concentration as more sodium hydroxide is generated in the cathode compartment. Under these circumstances the current efficiency for producing sodium hydroxide is about 75 percent, while using a sulfonic type membrane.

A direct current of 35 amperes is passed through the cell by the application of a potential of about 14 to 15 volts. Under these circumstances it is found that about 200 mls. of water is drawn from the sol into the cathode compartment along with each gram equivalent of sodium. Simultaneously about 250 mls. per hour of the concentrated 400 gpl $SiO_2$ solution of sodium silicate is continuously added to the circulating sol electrolyte to maintain the pH between 9.0 and 9.5.

After operating under these conditions for 8.7 hours with a current ranging from 35 to 36 amperes, sodium hydroxide is recovered from the cathode compartment in a yield of 75 percent of the theoretical amount estimated from Faraday's law, according to which 310 ampere hours theoretically would generate 11.6 gram equivalents of sodium hydroxide, or 360 grams of sodium oxide.

The sol produced is a translucent liquid containing 30 grams of silica per 100 mls. The silica has a specific surface area of about 180 m²/g., corresponding to a particle size of about 15 millimicrons.

The sol is deionized by passing it through a mixed bed of anion and cation exchange resins and then readjusted to pH 9 by the addition of dilute sodium hydroxide solution and then concentrated to 40 percent by weight of $SiO_2$ by evaporation.

EXAMPLE V

This is an example of the process of this invention employing the apparatus of Example IV, in which the space between the membranes is reduced to about one-eighth of an inch to reduce the electrical resistance of the current passing through the sol electrolyte, and the concentration of sodium sulfate is reduced. The sol electrolyte system is loaded with a solution made up as in Example IV, but containing 0.6 percent silica and a sulfate ion concentration of 0.045 normality. The operation is carried out as described in Example IV, and continued until the silica concentration of 35 grams per 100 mls. is obtained. The surface area of the silica is 160 m²/g. and the particle size is 17 millimicrons.

EXAMPLE VI

A silica sol is made in a manner similar to that of Example V, except that a solution of sodium silicate containing 3.3 percent by weight of $SiO_2$ and 1.0 percent by weight of sodium oxide present as soluble alkali is neutralized only with sufficient acid to provide a sulfate ion concentration of 0.05 normality. Less than 1/6th of the alkali is thus neutralized with acid, after which the remaining alkali is removed by electrodialysis until the pH is reduced to 9.2. Electrodialysis is then continued with the simultaneous addition of concentrated sodium silicate solution as described in Example IV, to maintain a pH between 9.0 and 9.5, until a concentration of 35 grams of $SiO_2$ per 100 mls. is obtained. The specific surface area of the silica is 200 square meters per gram, and the particles about 14 millimicrons in diameter.

The sol, containing 0.05 normality of sodium sulfate, is employed as a binder for ceramic particles in making molds for precision casting, where the presence of the sodium sulfate accelerates the setting of the mold forms. A portion of the sol is deionized to remove sodium and sulfate ions and stabilized with sufficient ammonia to give a pH of 9, and employed in making pure silica gel.

I claim:

1. In an electrodialysis process for making silica sol wherein a sol-electrolyte comprising an aqueous silica sol and an aqueous sodium or potassium silicate solution is maintained at a temperature of about 50° to 100° C., and a pH of from 8 to 9.5, agitated and electrolyzed while separated from an aqueous acid anolyte by a cation-permeable, anion impermeable membrane, the improvement for producing stable colloidal silica sols having controlled particle size which comprises:

maintaining in the sol-electrolyte a supplementary electrolyte in the form of a sodium or potassium salt of a non-siliceous anion at a concentration between 0.01 and 0.15 normal.

2. Process of claim 1 wherein the supplementary electrolyte is a member of the group consisting of sodium sulfate, sodium carbonate, potassium sulfate and potassium carbonate.

3. Process of claim 1 wherein the temperature and pH of the sol-electrolyte are maintained at about 80° C. and 9, respectively, and the normality of the supplementary electrolyte in the catholyte is maintained at about 0.03 to 0.08 normal.

4. Process of claim 3 wherein the sol-electrolyte is composed of aqueous silica, sodium silicate, and sodium sulfate or carbonate.

* * * * *